Patented Oct. 4, 1949

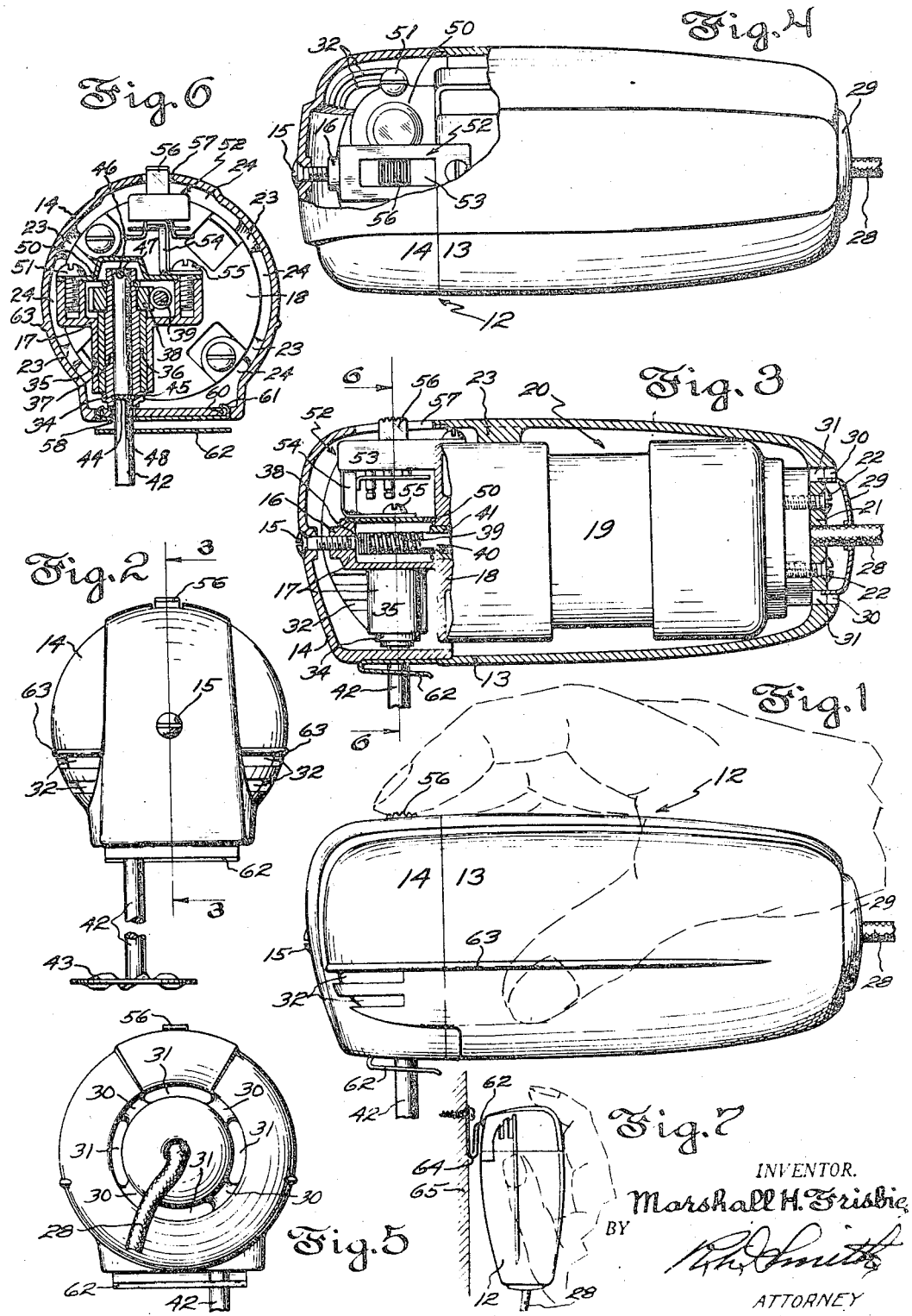

2,483,727

UNITED STATES PATENT OFFICE 2,483,727

POWER DRIVEN PALM GRASPED KITCHEN APPLIANCE

Marshall H. Frisbie, Hamden, Conn., assignor to The A. C. Gilbert Company, New Haven, Conn., a corporation of Maryland Application July 24, 1945, Serial No. 606,847

24 Claims. (Cl. 172—36)

This invention relates to a portable electrically powered stirring appliance such as a household food mixer differing from appliances heretofore proposed for this purpose in being sufficiently small and compact to permit its overall body contours to be grasped directly against the palm of the operator's hand so that the casing of the appliance forms the sole handle for maneuvering it.

The component major sections of portable powered food mixers have heretofore not been organized so far as I am aware in a form of assemblage that lends itself to this newly proposed manner of use. The present invention has the following contributory objectives:

It aims to relieve the casing of a power mixer of its traditional duty of serving as a supporting framework on which to mount as separate units the various interior mechanical or working parts of a power mixer such as the power transmission gearing and the rotary bearings for the driving spindle of the mixing tool. This enables the casing to be made as a hollow shell of light weight electrical insulative material molded to a deeply cupped shape having motor encompassing walls that for cooling purposes are spaced for the most part from the motor body. Thus the hand held casing remains cool and is in less intimate junction with sources of heat and vibration.

A contributory object is to support the motor body solely or principally by fastening one end thereof to internal lugs or flanges at one end of the deeply cupped casing shell and to support directly upon the other end of the motor body all power transmission mechanism and tool driving connections.

Another object is to make the casing in separable sections, one comprising a head cap that shall be removable from both the deeply cupped main shell section of the casing and from all shell contained motor driven mechanism without interfering with the working assemblage of the appliance mechanism.

A further object is to fashion the outer contours of the removable head cap on the general lines of the profile shape of a grasshopper's head so that its nose end slopes inward and downward to form a blunt-ended longitudinal continuation of the deeply cupped main shell section of the casing thus enabling this cap to be overlapped and firmly gripped by at least two fingers of the operator's hand while the remainder of the casing remains firmly grasped against the palm of the hand. A related object is to locate a motor control switch in the crown space of such head cap so that its operating handle can easily be reached and manipulated by a finger of that hand of the operator that is supporting and maneuvering the appliance.

A still further object is to provide the casing with an external hook clip located aside from the hand grasped surfaces of the casing whereby the appliance may conveniently be hung up on the wall when not in use.

These and other objects of the invention are attained by structure herein chosen to explain the invention and which is described hereinafter and illustrated in the appended drawings wherein:

Fig. 1 is a side view of my improved palm grasped power unit appliance.

Fig. 2 is an outside view looking endwise at the head end of the appliance.

Fig. 3 is a view similar to Fig. 1 showing the parts partially in section on the plane 3—3 in Fig. 2.

Fig. 4 is an outside view looking downward on Fig. 3.

Fig. 5 is a rear end view looking from the right at Fig. 1 with casing partly broken away.

Fig. 6 is a view taken in section through the transmission mechanism on the plane 6—6 in Fig. 3 looking in the direction of the arrows.

Fig. 7 is a fragmentary view showing the appliance hung up on a wall for out of the way storage.

In practising this invention I provide a hollow elongated handle 12 which constitutes also the casing of the appliance, it being of sufficiently small girth to be grasped between the palm and fingers of an operator's hand as pictured in Figs. 1 and 7 for supporting and maneuvering the appliance as a whole. This casing handle comprises a deeply cupped hollow barrel section 13 and a more shallowly cupped mating closure section or closure head in the form of a hollow shell 14, said cupped sections having their rim edges held in separable abutting relation by means of a fastening screw 15. Together, barrel section 13 and closure section 14 may be referred to as the casing shell. Screw 15 threads into a hole in boss 16 on the wall of a gear case 17. This gear case as herein shown is integral with the end bearing cap 18 and therewith comprises bracket-like support structure exclusive of closure section 14 and rigid with the stator 19 of an electric motor 20 whose opposite end, remote from closure section 14, is securely fastened to the end wall 21 of barrel section 13 by means of holding screws 22. Thus gear case 17 is fully and adequately supported without the instrumentality of closure section 14. Motor 20 is steadied and held centrally within the appliance handle by its contact with internal ribs 23 running lengthwise of barrel section 13 and which may be cast or molded integrally therewith in circumferentially spaced relation. Motor 20 and barrel 13 constitute an elongated power unit that also serves as the handle of the appliance.

An attachment cord 28 reaches motor 20 by passing through a hole in the cross wall 21 at the trailing end of the appliance and is steadied and centralized by an external decorative guard cap 29 that snugly fits, and is removably lodged, in the surrounding end structure 30 of barrel section 13. Ventilating and cooling passageways 24 extending longitudinally between motor steadying ribs 23 permit flow of air from ventilation apertures 31 in the rear end of barrel section 13 to ventilation apertures 32 located in a portion of the front closure section 14 nearest a chuck device hereinafter described.

The gear box 17 provides a vertically elongated bearing 35 equipped with an internal bushing 36 of suitably soft bearing metal in which is journaled a hollow vertical shaft 37 on which is fixed a worm gear 38 in mesh with a worm 39 cut in the end portion of motor shaft 40. Hollow shaft 37 comprises a tubular extension fixed to and projecting from gear 38 while motor shaft 40 is journaled in the usual two bearings at opposite ends of the motor stator 19, the front one of which bearings is indicated at 41 in Fig. 3. The top end of vertical bearing bushing 36 takes the downward thrust of worm gear 38 and the bottom end of bearing bushing 36 takes the upward thrust of an external annular shoulder 34 on shaft 37.

The hollow interior of shaft 37 constitutes a chuck socket adapted to receive hold and rotate the spindle 42 of a liquid stirring tool 43. For this purpose chuck shaft 37 carries in its internal circular groove 45 a diametrically expansible detent ring 44 that will snap removably into a circular groove 48 in spindle 42 thereby yieldingly to hold the tool spindle 42 in its fully inserted position within chuck shaft 37. In this position a notch 46 cut crosswise diametrically in the end of spindle 42 interlocks rotatively with a pin 47 fixed crosswise diametrically in the hollow of shaft 37. These mechanical elements complete what may be termed a chuck device effective to hold and rotate spindle 42 about an axis extending crosswise the handle casing 12. As evident in Figs. 3 and 6, the whole of this chuck device is encompassed by the smooth longitudinal sweep of the wall of the hollow elongated handle or casing shell 13, 14 from which the tool spindle 42 projects in a lateral direction.

Gear box 17 is provided with a removable cover plate 50 secured by screws 51 which will retain lubricant packed about the worm and worm gear transmission mechanism. It is evident from Figs. 3 and 6 that gear box 17 is an elbow shaped bracket structure disposed to leave available a sizable corner space above cover 50 within the upper front or crown portion of closure section 14 which space affords room to mount a multiple speed motor starting and stopping electric switch 52 having conventional change speed electric circuit connections to motor 20 which it is not necessary herein to explain in detail. Switch 52 contains the usual stationary and movable contacts in its body 53 which is perched firmly on a rigid supporting bracket 54 removably mounted on the top of gear case 17 by screws 55. The handle 56 of switch 52 projects workably through an elongated aperture 57 in closure section 14 and has a roughened top end for better finger pressure cling in pushing it backward and forward lengthwise of the appliance handle between "Off," low speed, and high speed positions.

Closure section 14 contains a hole 58 so registering with the end of hollow shaft 37 that the tool spindle 42 may be guided by hole 58 dependably into the chuck device. Thus the chuck device may be confined entirely to the interior of closure section 14 and still be accessible for the convenient insertion and withdrawal of the tool spindle 42.

To enable my improved appliance when not in use to be hung up conveniently and stored out of the way against a wall, I provide a hook clip 62 secured to the outside of the closure section 14 by means of bent over tangs 61 extending through slots 60 in the wall of the closure section. This hook clip is disposed for hanging up the appliance with its barrel section 13 and the attachment cord 28 depending from the closure section 14. Figs. 1 and 6 show that hook 62 is broad and thin and has its broadside face spaced from the casing shell and contains a hole in register with hole 58 in the casing shell likewise admissive to tool stem 42 so that the hole in hook 62 assists in aligning the tool stem with the chuck when inserted therein. In such hung-up position the appliance is ready to be taken down by the hand of the operator and placed in use without shifting his hand grasp on casing 12. Any stationary hanger fitting 64 fastened to a wall 65 and shaped supportingly to engage the hook clip 62 in the manner indicated in Fig. 7 may be provided.

It will further be noted that barrel section 13 is provided with a longitudinal external ridge 63 extending along each side which if made sufficiently outstanding will limit or resist the free rolling of the appliance on a table top to prevent the food stirring tool, if not removed from the appliance, from swinging downward into contact with the table top and thereby becoming soiled when the appliance is temporarily laid down in the course of using it.

In operation the appliance is grasped in any convenient manner against the palm of the hand, and the spindle 42 of a stirring, mixing or other tool is inserted through hole 58 into the chuck device of hollow shaft 37. The index finger of the operator's hand that holds the appliance is then free to shift the switch handle 56 back and forth to run the motor at low or high speeds or to stop it. This makes it as easy as the turn of a wrist to maneuver and place the agitating end of the stirring tool in any desired corner or location of a miscible food substance containing utensil either while the same is on or off the stove. This is due in part to the concentration of motor weight falling within rather than in offset relation to the grasp of the operator's hand. The fact that the tool spindle 42 is offset laterally from the longitudinal center of the appliance, or in effect projects from a corner of the appliance head, makes it still easier to observe and direct the stirring tool at any desired angle into a utensil containing the substance to be agitated.

The appended claims are directed to and intended to cover obvious substitutes for the kinds and arrangements of parts herein disclosed.

I claim:

1. A portable electrical appliance containing a power unit for driving rotary tools, embodying in combination, a hollow elongated handle for housing said power unit of sufficiently small girth to be grasped between the palm and fingers of an operator's hand thereby to be supported for maneuvering the appliance, said handle including a hollow barrel section and a hollow closure section mating with an end of said barrel section and separable therefrom, a motor in said barrel section having a stator secured to the latter, transmission mechanism in said hollow handle powered by said motor, support structure inside of said hollow handle structurally exclusive of said closure section carried by said motor including a bracket structure rigid with said motor stator carrying said transmission mechanism, and a chuck rotatable by said mechanism about an axis directed transversely of said elongated handle constructed and arranged detachably to hold a rotary tool and rotate the same externally of said handle about said axis.

2. A portable electrical appliance containing a power unit for driving rotary tools, embodying in combination, a hollow elongated handle for housing said power unit of sufficiently small girth to be grasped between the palm and fingers of an operator's hand thereby to be supported for maneuvering it, said handle including a hollow barrel section and a hollow closure section mating with an end of said barrel section and separable therefrom, a motor in said barrel section, transmission mechanism in said hollow handle powered by said motor including gear members and angularly related shafts respectively connected thereto, a gear box in said hollow handle containing said members comprising an elbow structure shaped and arranged to leave a corner space at the end of said motor located at least partially within said closure section and incorporating a bearing guiding at least one of said shafts for rotation about an axis directed transversely of said elongated handle casing, a control switch for said electric motor located in said corner space, and a chuck device receptive to a tool rotatable by said shaft about said axis.

3. A portable electrical appliance as defined in claim 2, in which the said hollow elongated handle contains an aperture opening into the said corner space, and the said control switch includes circuit making and breaking contacts electrically connected to control the said motor, together with a contact operating extension projecting through said aperture in a manner to be accessible to one of the said fingers of the operator's hand while the remaining fingers of the same hand grasp said handle.

4. A portable electrical appliance containing a power unit for driving rotary tools, embodying in combination, a hollow elongated handle for housing said power unit of sufficiently small girth to be grasped between the palm and fingers of an operator's hand thereby to be supported for maneuvering it, said handle including a hollow barrel section and a hollow closure section having a clearance hole and mating with an end of said barrel section and separable therefrom, a motor in said barrel section, transmission mechanism in said hollow handle powered by said motor including gear members and angularly related shafts, a gear box in said hollow handle containing said members having a threaded hole aligned with said clearance hole comprising an elbow structure shaped and arranged to leave vacant a corner space at the end of said motor at least partially within said closure section and incorporating a bearing guiding at least one of said shafts for rotation about an axis directed transversely of said elongated handle casing, a screw holding said handle sections together in separable mating relation passing through said clearance hole and engaged with said threaded hole, a control switch for said electric motor located in said corner space, and a chuck device receptive to a tool rotatable by said shaft about said axis.

5. A portable electrical appliance containing a power unit for driving rotary tools, embodying in combination, a hollow elongated handle for housing said power unit of sufficiently small girth to be grasped between the palm and fingers of an operator's hand thereby to be supported for maneuvering the appliance, said handle including a hollow barrel section and a hollow closure section mating with an end of said barrel section and separable therefrom, a motor in said barrel section, a transmission mechanism in said hollow section powered by said motor, support structure inside of said hollow handle structurally exclusive of said closure section carried by said motor and carrying said transmission mechanism, and a chuck rotatable by said mechanism about an axis directed transversely of said elongated handle constructed and arranged detachably to hold a rotary tool and rotate the same externally of said handle about said axis, together with fastening means releasably connecting said closure section of the appliance handle to the support structure for holding the former in separable mating relation to said barrel section of said handle.

6. A portable electrical appliance for holding and driving rotary tools, embodying in combination, an elongated power unit comprising a motor having a rotor and a stator with a casing surrounding said motor graspingly encompassable by an operator's hand, a hollow closure head detachably held in fixed relation to said power unit, a rotary power transmission mechanism driven by said motor, rotor bearing structure carrying said mechanism fixed on said stator and thereby supported without the instrumentality of said head, and a chuck device for detachably holding a rotary tool connected to be rotated by said transmission mechanism and journaled in said bearing structure in a manner to rotate about an axis directed transversely of said elongated power unit.

7. A portable electrical appliance for holding and driving rotary tools, embodying in combination, an elongated power unit comprising a motor having a rotor and a stator with a casing surrounding said motor graspingly encompassable by an operator's hand, said casing including a hollow closure head detachably held against said power unit, a rotary power transmission mechanism driven by said motor, rotor bearing structure carrying said mechanism fixed on said power unit and thereby supported without the instrumentality of said head, and a chuck device confined mainly to the interior of said casing for detachably holding a rotary tool and rotating the same outside said head connected to be rotated by said transmission mechanism and journaled in said bearing structure in a manner to rotate about an axis directed transversely of said elongated power unit, said closure head having a cutout registering with said chuck device to admit a portion of said tool thereto.

8. A portable electrical appliance for holding and driving rotary tools, embodying in combination, an elongated power unit comprising a motor having a rotor and a stator with a casing surrounding said motor graspingly encompassable by an operator's hand, said casing including a hollow closure head detachably held against said power unit, a rotary power transmission mechanism driven by said motor including gear members and angularly related shafts, a gear box within and separable from said casing housing said gear members, and a chuck device connected to be rotated by said transmission mechanism and journaled in said gear box in a manner to rotate about an axis directed transversely of said elongated power unit constructed and arranged detachably to hold a rotary tool for rotating said tool externally of said closure head.

9. A portable electrical appliance for holding and driving rotary tools, embodying in combination, an elongated power unit comprising a motor having a rotor and a stator with a casing surrounding said motor graspingly encompassable by an operator's hand, said casing including a hollow closure head detachably held against said power unit, a rotary power transmission mechanism driven by said motor including gear members and angularly related shafts, a gear box within and separable from said casing housing said gear members, support structure inside of said casing structurally exclusive of said closure head carried by said power unit and carrying said gear box, and a chuck device connected to be rotated by said transmission mechanism journaled in said gear box in a manner to rotate about an axis directed transversely of said elongated power unit constructed and arranged detachably to hold a rotary tool for rotating the same externally of said closure head.

10. A portable electrical appliance for holding and driving rotary tools, embodying in combination, an elongated power unit comprising a motor having a rotor and a stator with a casing surrounding said motor graspingly encompassable by an operator's hand, a hollow closure head opening toward said power unit, a rotary power transmission mechanism driven by said motor, rotor bearing structure carrying said mechanism fixed on said stator and thereby supported without the instrumentality of said head, fastening means releasably connecting said closure head to said structure, and a chuck device for detachably holding a rotary tool connected to be rotated by said transmission mechanism and journaled in said bearing structure in a manner to rotate about an axis directed transversely of said elongated power unit.

11. A portable electrical appliance for holding and driving rotary tools, embodying in combination, an elongated power unit comprising a motor having a rotor and a stator with a casing surrounding said motor graspingly encompassable by an operator's hand, said casing including a hollow closure head opening toward and detachably held against said power unit, a rotary power transmission mechanism driven by said motor, rotor bearing structure carrying said mechanism fixed on said stator and thereby supported without the instrumentality of said head, a chuck device within said casing for detachably holding a tool in position to extend outside said head, said chuck device being connected to be rotated by said transmission mechanism and journaled in said bearing structure in a manner to rotate about an axis directed transversely of said elongated power unit, and ventilating passageways through the appliance in the neighborhood of said motor having openings through a portion of said closure head flanking said chuck device.

12. A portable electrical appliance for holding and driving rotary tools, embodying in combination, an elongated power unit comprising a motor having a rotor and a stator with a hollow casing surrounding said motor graspingly encompassable by an operator's hand, said casing including a hollow closure head detachably held against said power unit, a rotary power transmission mechanism driven by said motor including gear members and angularly related shafts, a gear box within and separable from said casing housing said gear members, and a chuck device including an elongated hollow section of one of said shafts connected to be rotated by said transmission mechanism and journaled in said gear box in a manner to rotate about an axis directed transversely of said elongated power unit constructed and arranged detachably to hold a rotary tool for rotating the same externally of said closure head.

13. A portable electrical appliance as defined in claim 12, in which the said one of the said angularly related shafts having the said hollow section comprises a tubular extension fixed to and projecting from one of the said gear members.

14. A portable electrical appliance as defined in claim 12, in which the said gear members comprise a worm on the said rotor of the motor, and a worm wheel in mesh with said worm, the said one of the said angularly related shafts having the said hollow section comprising a tubular extension fixed to and extending from said worm wheel.

15. A portable electrical appliance as defined in claim 12, in which the said chuck device includes a diametrically expansible detent ring within the said elongated hollow section of one of the said shafts and within the said casing, and a pin fixed in said shaft section extending crosswise the hollow thereof, said ring and said pin being relatively disposed to cooperate in simultaneously engaging with a rotary tool in a manner to hold the rotary tool removably in said shaft section and impart rotary drive thereto.

16. A portable electrical appliance for holding and driving rotary tools, embodying in combination, an elongated power unit comprising a motor having a rotor and a stator with a casing surrounding said motor of sufficiently small girth to be grasped between the palm and fingers of an operator's hand in a manner to be supported thereby for maneuvering the appliance, a hollow closure head detachably held in fixed relation to one end of said power unit, a rotary power transmission mechanism driven by said motor, bearing structure carrying said mechanism fixed on said stator and thereby supported without the instrumentality of said head, and a rotary tool connected to be rotated by said transmission mechanism and rotatably aligned by said bearing structure in a manner to rotate about an axis directed transversely of said elongated power unit.

17. A portable electrical appliance as defined in claim 16, in which the said elongated power unit comprises an elongated motor body and an elongated hollow casing closely encompassing it, together with bolts directed lengthwise of said elongated power unit confined to the end portion of said casing opposite the said closure head fastening together said motor body and said casing.

18. A portable electrical appliance as defined in claim 16, together with removable bolts arranged to fasten together the said motor stator and the said casing directed lengthwise of said elongated power unit and confined to one side of the said motor rotor.

19. A portable electrical appliance as defined in claim 16, together with removable bolts arranged to engage and clamp together only the corresponding ends of the said motor stator and the said casing, said bolts being directed lengthwise of said elongated power unit.

20. A portable electrical appliance for holding and driving rotary tools, embodying in combination, a motor, an elongated casing having a barrel portion encompassing said motor of sufficiently small external girth to be grasped and held between the palm and fingers of an operator's hand and of sufficiently large internal girth to afford a passageway between said motor and said casing extending longitudinally of the latter, said casing also having front and rear end walls containing openings at least some of which openings communicate with said passageway, motor holding screws extending through said rear end wall of said casing, and a guard cap having flanges removably lodged in openings in said rear casing wall of shape and size to leave unobstructed said passageway communicating openings.

21. A portable electrical appliance as defined in claim 20, in which the said guard cap covers and conceals the said motor holding screws.

22. A portable electrical appliance as defined in claim 20, together with an electrical attachment cord leading current to the said motor extending through both the said rear casing wall and the said guard cap and sufficiently well fitting the latter to be centralized and steadied thereby.

23. A portable electrical appliance as defined in claim 20, in which the said guard cap covers and conceals the said motor holding screws, together with an electrical attachment cord leading current to the said motor extending through both the said rear casing wall and said guard cap and sufficiently well fitting the latter to be substantially centralized and steadied thereby.

24. In a portable electrical appliance for holding and driving rotary tools, a power unit including a motor with a surrounding elongated casing graspingly encompassable by an operator's hand having opposite head and trailing ends, an electrical attachment cord entering the trailing end of said elongated casing, a chuck within the head end of said casing driven by said motor, said casing having a hole located to admit to said chuck a detachable rotary tool, and a broad thin hook on the head end of said appliance pointing toward the trailing end thereof, whereby the appliance may be hung up with said elongated casing vertically disposed and with said attachment cord depending from the trailing end thereof said hook having its broadside face spaced from said casing and containing a hole in register with said casing hole admissive to said rotary tool to assist in aligning the same with said chuck.

MARSHALL H. FRISBIE.

REFERENCES CITED

The following references are of record in the file of this patent:

UNITED STATES PATENTS

| Number | Name | Date |
|---|---|---|
| 950,759 | Weiner | Mar. 1, 1910 |
| 1,377,288 | Soresi | May 10, 1921 |
| 1,489,182 | Weinberg | Apr. 1, 1924 |
| 1,655,447 | Wait | Jan. 10, 1928 |
| 1,781,381 | Gilbert | Nov. 11, 1930 |
| 2,015,535 | Sacrey | Sept. 24, 1935 |
| 2,155,082 | Decker | Apr. 18, 1939 |
| 2,161,881 | Musolf | June 13, 1939 |
| 2,179,745 | Kochner | Nov. 14, 1939 |
| 2,182,083 | Jepson et al. | Dec. 5, 1939 |
| 2,293,959 | Wright | Aug. 25, 1942 |
| 2,323,945 | Strauss et al. | July 13, 1943 |
| 2,382,158 | Kennedy | Aug. 14, 1945 |

Certificate of Correction

October 4, 1949

Patent No. 2,483,727    MARSHALL H. FRISBIE

It is hereby certified that errors appear in the printed specification of the above numbered patent requiring correction as follows:

Column 6, line 29, for the words "hollow section" read *hollow handle*; line 40, for "the support" read *said support*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*